United States Patent
Katsumata et al.

(10) Patent No.: US 11,278,877 B2
(45) Date of Patent: Mar. 22, 2022

(54) PHOTOCATALYST, PHOTOCATALYST CARRIER, METHOD FOR PRODUCING PHOTOCATALYST, AND METHOD FOR PRODUCING PHOTOCATALYST CARRIER

(71) Applicant: Mitsubishi Electric Corporation, Chiyoda-ku (JP)

(72) Inventors: Noriaki Katsumata, Chiyoda-ku (JP); Yoko Matsuura, Chiyoda-ku (JP); Noboru Wada, Chiyoda-ku (JP); Ryu Abe, Kyoto (JP); Osamu Tomita, Kyoto (JP); Masaya Shigemitsu, Kyoto (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 144 days.

(21) Appl. No.: 16/629,186

(22) PCT Filed: May 28, 2018

(86) PCT No.: PCT/JP2018/020329
§ 371 (c)(1),
(2) Date: Jan. 7, 2020

(87) PCT Pub. No.: WO2019/039021
PCT Pub. Date: Feb. 28, 2019

(65) Prior Publication Data
US 2020/0222888 A1 Jul. 16, 2020

(30) Foreign Application Priority Data
Aug. 22, 2017 (JP) .............................. JP2017-159003

(51) Int. Cl.
*B01J 35/00* (2006.01)
*B01J 21/06* (2006.01)
(Continued)

(52) U.S. Cl.
CPC ........... *B01J 35/004* (2013.01); *B01J 21/063* (2013.01); *B01J 23/30* (2013.01); *B01J 35/006* (2013.01);
(Continued)

(58) Field of Classification Search
CPC ........ B01J 21/063; B01J 23/30; B01J 35/004; B01J 35/006; B01J 35/02; B01J 37/04; B01J 37/08; C01P 2004/64; C01P 2004/82
(Continued)

(56) References Cited

U.S. PATENT DOCUMENTS 2,694,049 A * 11/1954 Reynolds ................. C07C 31/10
502/309
2002/0077251 A1 * 6/2002 Okusako ................. B01J 21/063
502/350
(Continued)

FOREIGN PATENT DOCUMENTS

CN 10 5817256 * 8/2016 .............. B01J 27/24
JP 2007-216223 A 8/2007
(Continued)

OTHER PUBLICATIONS

Extended European Search Report dated Aug. 7, 2020 in European Patent Application No. 18848152.7, 9 pages.
(Continued)

*Primary Examiner* — Patricia L. Hailey
(74) *Attorney, Agent, or Firm* — Xsensus LLP

(57) ABSTRACT

In a photocatalyst and a photocatalyst carrier, tungsten oxide microcrystals that have a crystal grain size of 10 nm or less and oxidizes a gaseous chemical substance and titanium oxide microcrystals that have a crystal grain size of 10 nm or less and oxidizes the gaseous chemical substance are irregularly arranged to form a solid.

8 Claims, 4 Drawing Sheets

(51) Int. Cl.
*B01J 23/30* (2006.01)
*B01J 35/02* (2006.01)
*B01J 37/04* (2006.01)
*B01J 37/08* (2006.01)

(52) U.S. Cl.
CPC ............... *B01J 35/02* (2013.01); *B01J 37/04* (2013.01); *B01J 37/08* (2013.01)

(58) Field of Classification Search
USPC .................................................. 502/309, 350
See application file for complete search history.

(56) References Cited

U.S. PATENT DOCUMENTS

| 2004/0241040 | A1* | 12/2004 | Wei ..................... B01J 37/0244 422/4 |
| 2007/0193875 | A1 | 8/2007 | Ham et al. |
| 2007/0237943 | A1* | 10/2007 | Wakizaka ................ C09D 5/14 428/328 |
| 2008/0119352 | A1* | 5/2008 | Kitaguchi .............. B01D 53/88 502/74 |
| 2009/0093361 | A1* | 4/2009 | Sakatani ................ B01J 35/004 502/309 |
| 2010/0304954 | A1* | 12/2010 | Sogabe .................... B01J 23/30 502/5 |
| 2011/0082026 | A1* | 4/2011 | Sakatani ................. B01J 23/30 502/159 |
| 2013/0095998 | A1* | 4/2013 | Hosogi ................. B01J 23/888 502/309 |
| 2013/0180932 | A1* | 7/2013 | Fukumura ................ B01J 23/30 210/749 |
| 2016/0129432 | A1* | 5/2016 | Ozaki ...................... B01J 35/06 423/245.1 |
| 2016/0250621 | A1* | 9/2016 | Furudate .................. B01J 23/72 502/242 |
| 2018/0147572 | A1* | 5/2018 | Fukumura ............ B01J 20/3204 |

FOREIGN PATENT DOCUMENTS

| JP | 2011-56470 A | 3/2011 |
| JP | 2012-110831 A | 6/2012 |
| JP | 2013-208589 A | 10/2013 |
| JP | 2015-51387 A | 3/2015 |
| JP | 2016-87522 A | 5/2016 |

OTHER PUBLICATIONS

International Search Report dated Aug. 21, 2018 in PCT/JP2018/020329 filed on May 28, 2018, 2 pages.
Japanese Office Action dated Jan. 25, 2019 in Japanese Patent Application No. 2018-557146 (with unedited computer generated English translation), 22 total pages.
Mirghani et al., "Experimental study and modeling of photocatalytic reduction of $Pb^{2+}$ by $WO_3/TiO_2$ nanoparticles", Separation and Purification Technology, 2015, vol. 141, pp. 285-293.
Anandan et al., "Synthesis of $TiO_2/WO_3$ nanoparticles via sonochemical approach for the photocatalytic degradation of methylene blue under visible light illumination", Ultrasonics Sonochemistry, 2014, vol. 21, pp. 1964-1968.

* cited by examiner

US 11,278,877 B2

PHOTOCATALYST, PHOTOCATALYST CARRIER, METHOD FOR PRODUCING PHOTOCATALYST, AND METHOD FOR PRODUCING PHOTOCATALYST CARRIER

TECHNICAL FIELD

The present invention relates to a photocatalyst that is excited by irradiation with light, a photocatalyst carrier, a method for producing a photocatalyst, and a method for producing a photocatalyst carrier.

BACKGROUND ART

Among existing photocatalysts, for example, titanium oxide is known to decompose chemical substances upon irradiation with light in the ultraviolet light region. However, titanium oxide does not exert catalytic activity upon irradiation with light in the visible light region at wavelengths of 400 nm or more. For this reason, a photocatalyst was developed that decomposes chemical substances even upon irradiation with light in the visible light region. Tungsten oxide has a broader light absorption spectrum than titanium oxide, and is known to cause a photocatalytic reaction even upon irradiation with light at wavelengths of 400 nm or more in the visible light region.

However, when tungsten oxide is used as a photocatalyst for decomposing gaseous organic compounds, tungsten oxide alone has a low capability of decomposing chemical substances, and cannot sufficiently decompose chemical substances. Thus, a composite-material photocatalyst in which tungsten oxide particles are combined with another catalyst material has been proposed (for example, refer to Patent Literature 1). Patent Literature 1 discloses a photocatalyst that rapidly decomposes volatile aromatic compounds in a gas phase, and a method for producing the photocatalyst. The photocatalyst of Patent Literature 1 contains tungsten oxide particles as the main component, and the surfaces of the tungsten oxide particles are covered with titanium oxide particles. In Patent Literature 1, such a photocatalyst is produced by synthesizing, from a tungsten oxide precursor, tungsten oxide particles, and then mixing and firing the resultant tungsten oxide particles and a titanium oxide precursor.

CITATION LIST

Patent Literature

Patent Literature 1: Japanese Unexamined Patent Application Publication No. 2012-110831

SUMMARY OF INVENTION

Technical Problem

Composite-material photocatalysts exert high catalytic activity due to transfer of electrons and holes (electron holes) generated by photoirradiation. Thus, the larger the contact area between the catalytic materials, the higher the resultant catalytic activity. However, in the method for producing a photocatalyst in Patent Literature 1, tungsten oxide particles are formed in advance and titanium oxide particles are subsequently formed on the surfaces of the tungsten oxide particles. In such a production method, tungsten oxide particles aggregate during intermediate steps of production. As a result, in the produced photocatalyst, there may be a case that the surfaces of tungsten oxide is not be effectively used.

The present invention has been made to address such problems. An object of the present invention is to provide a photocatalyst and a photocatalyst carrier that efficiently decompose gaseous chemical substances, a method for producing a photocatalyst, and a method for producing a photocatalyst carrier.

Solution to Problem

In a photocatalyst and a photocatalyst carrier according to embodiments of the present invention, tungsten oxide microcrystals that have a crystal grain size of 10 nm or less and oxidizes a gaseous chemical substance and titanium oxide microcrystals that have a crystal grain size of 10 nm or less and oxidizes a gaseous chemical substance are irregularly arranged to form a solid.

A method for producing a photocatalyst according to another embodiment of the present invention includes preparing a dispersion liquid containing a precursor of tungsten oxide microcrystals and a precursor of titanium oxide microcrystals, and firing the dispersion liquid, to obtain a photocatalyst in which tungsten oxide microcrystals that have a crystal grain size of 10 nm or less and oxidizes a gaseous chemical substance and titanium oxide microcrystals that have a crystal grain size of 10 nm or less and oxidizes a gaseous chemical substance are irregularly arranged to form a solid.

A method for producing a photocatalyst carrier according to still another embodiment of the present invention includes applying a dispersion liquid containing a precursor of tungsten oxide microcrystals and a precursor of titanium oxide microcrystals to a carrier base, and firing the applied dispersion liquid to form a photocatalyst layer, to obtain a photocatalyst carrier including a photocatalyst in which tungsten oxide microcrystals that have a crystal grain size of 10 nm or less and oxidizes a gaseous chemical substance and titanium oxide microcrystals that have a crystal grain size of 10 nm or less and oxidizes a gaseous chemical substance are irregularly arranged to form a solid, and a carrier base carrying the photocatalyst.

Advantageous Effects of Invention

In a photocatalyst, a photocatalyst carrier, a method for producing a photocatalyst, and a method for producing a photocatalyst carrier of embodiments of the present invention, tungsten oxide and titanium oxide forming the photocatalyst are provided as microcrystals of 10 nm or less, to increase the specific surface area of the photocatalyst, to improve the capability of oxidizing gaseous chemical substances. In addition, substances forming the photocatalyst have larger contact areas therebetween, to facilitate transfer of electrons and holes (electron holes) generated by photoirradiation, to improve catalytic activity. Therefore, embodiments of the present invention enable efficient decomposition of gaseous chemical substances.

DESCRIPTION OF EMBODIMENTS

Embodiment 1

Figure 1:
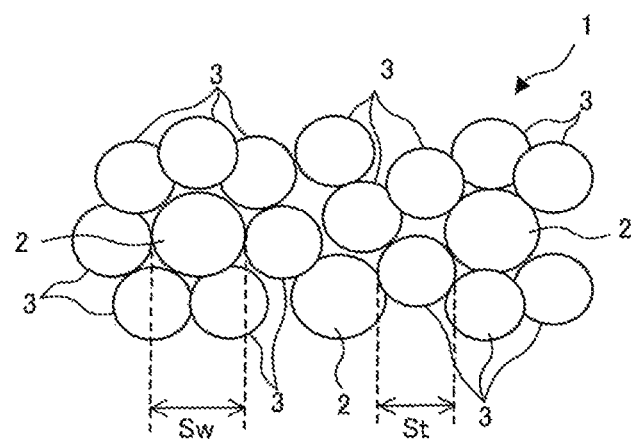
FIG. 1 is a schematic view of a photocatalyst according to Embodiment 1 of the present invention.

FIG. 1 is a schematic view of a photocatalyst 1 according to Embodiment 1 of the present invention. The photocatalyst 1 is excited by photoirradiation to exert a strong oxidizing power to decompose gaseous chemical substances. The photocatalyst 1 contains tungsten oxide that oxidizes chemical substances and titanium oxide that oxidizes chemical substances, and causes a photocatalytic reaction by not only light at wavelengths in the ultraviolet light region, but also light at wavelengths in the visible light region.

As illustrated in FIG. 1, in the photocatalyst 1, tungsten oxide crystals 2 and titanium oxide crystals 3 are irregularly arranged to form a solid. The tungsten oxide crystals 2 and the titanium oxide crystals 3 are microcrystals having a crystal grain size of 10 nm or less. FIG. 1 shows describes the crystal grain size Sw of a tungsten oxide crystal 2, and the crystal grain size St of a titanium oxide crystal 3. In the following description, tungsten oxide is tungsten trioxide ($WO_3$) and titanium oxide is titanium dioxide ($TiO_2$).

Figure 2:
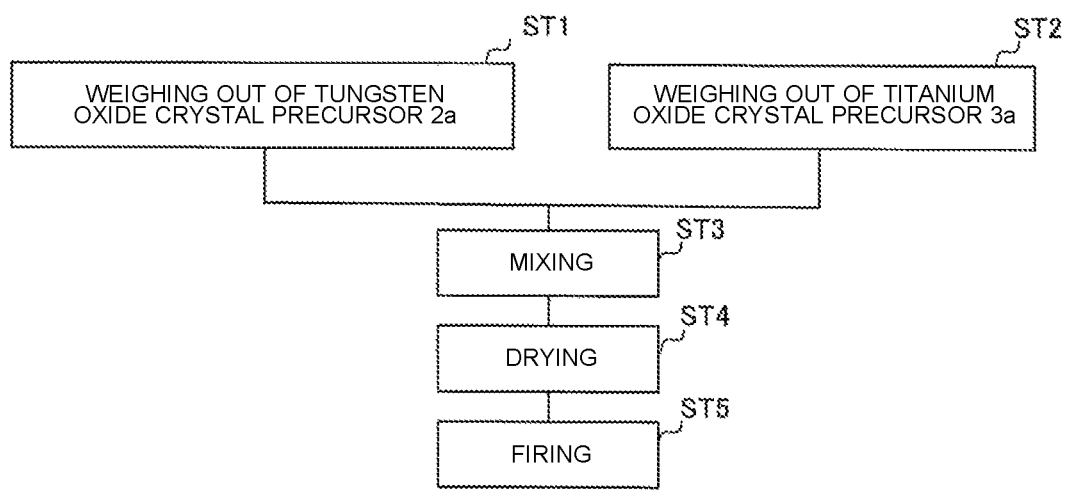
FIG. 2 illustrates steps of producing the photocatalyst according to Embodiment 1 of the present invention.

FIG. 2 illustrates steps of producing the photocatalyst according to Embodiment 1 of the present invention. The above-described photocatalyst 1 is produced by mixing a tungsten oxide crystal precursor 2a serving as the precursor of the tungsten oxide crystals 2 and a titanium oxide crystal precursor 3a serving as the precursor of the titanium oxide crystals 3, to prepare a mixture, and drying and firing the mixture.

As the tungsten oxide crystal precursor 2a, ammonium metatungstate is used. However, the tungsten oxide crystal precursor 2a is not limited to this, and may be any precursor that is fired to provide tungsten trioxide crystals. Examples of the tungsten oxide crystal precursor 2a include, in addition to the above-described ammonium metatungstate, ammonium paratungstate, tungstic acid, tungsten chloride, and tungsten alkoxide.

On the other hand, as the titanium oxide crystal precursor 3a, titanium lactate is used. However, the titanium oxide crystal precursor 3a is not limited to this, and may be any precursor that is fired to provide titanium dioxide crystals. Examples of the titanium oxide crystal precursor 3a include, in addition to the above-described titanium lactate, titanium trichloride, titanium tetrachloride, titanium sulfate, titanium oxysulfate, titanium oxychloride, and titanium tetraisopropoxide.

As illustrated in FIG. 2, a predetermined amount of the tungsten oxide crystal precursor 2a is weighed out (Step ST1), and a predetermined amount of the titanium oxide crystal precursor 3a is weighed out (Step ST2). Subsequently, the tungsten oxide crystal precursor 2a that has been weighed out and the titanium oxide crystal precursor 3a that has been weighed out are mixed to prepare a mixture (Step ST3). For example, the mixture is prepared with a mixing ratio of 20 parts by mass of titanium to 100 parts by mass of tungsten. The mixture is preferably a dispersion liquid prepared by dispersing, with a dispersing agent, the tungsten oxide crystal precursor 2a and the titanium oxide crystal precursor 3a.

As for the process of mixing the tungsten oxide crystal precursor 2a and the titanium oxide crystal precursor 3a, any method may be used. Examples of the process include mixing processes using, for example, a shaker, a motor mixer, a magnetic stirrer, a rotary mixer, a mixer, a vibratory mixer, or an ultrasonic mixer. Incidentally, the mixing ratio of the tungsten oxide crystal precursor 2a to the titanium oxide crystal precursor 3a is not particularly limited. The mixing ratio is preferably determined in accordance with, for example, the environment in which the photocatalyst 1 is disposed, the wavelength of light from the light source in the case of using a light source, or the target chemical substance to be decomposed.

The prepared mixture is subjected to blow drying (Step ST4), and fired at a predetermined temperature (for example, 420 degrees C.) (Step ST5). The process of drying the mixture may be any process. Examples of the drying process include, in addition to the blow drying, hot-air drying, infrared drying, hot-plate drying, reduced-pressure drying, and spray drying. The firing temperature for the photocatalyst 1 is not particularly limited, and may be any temperature at which the tungsten oxide crystals 2 and the titanium oxide crystals 3 are generated by firing in the photocatalyst 1.

In the photocatalyst 1 produced by the method, tungsten oxide and titanium oxide serving as catalytic materials are present as microcrystals and are irregularly arranged. The photocatalyst 1 has, as compared with the existing photocatalyst, a large specific surface area and large contact areas between photocatalyst-forming substances, to thereby achieve efficient decomposition of gaseous chemical substances.

The above-described advantages of the photocatalyst 1 are exhibited because the photocatalyst 1 contains the tungsten oxide crystals 2 and the titanium oxide crystals 3 respectively having crystal grain sizes Sw and St of 10 nm or less. For this reason, from the tungsten oxide crystal precursor 2a and the titanium oxide crystal precursor 3a serving as the main raw materials of the photocatalyst 1, the tungsten oxide crystals 2 and the titanium oxide crystals 3 illustrated in FIG. 1 need to be generated.

In general, as a method of determining whether or not tungsten trioxide crystals and titanium dioxide crystals are obtained, there is spectral analysis using an X-ray diffraction method. The diffraction patterns of tungsten trioxide crystals and titanium dioxide crystals are known. Substances containing tungsten trioxide crystals are observed to have diffraction peaks at diffraction angles 2θ of 23 degrees to 25 degrees and 31 degrees to 37 degrees. On the other hand, substances containing anatase-type titanium dioxide crystals are observed by the X-ray diffraction method to have diffraction peaks at diffraction angles 2θ of 24 degrees to 27 degrees and 46 degrees to 50 degrees.

Figure 3:
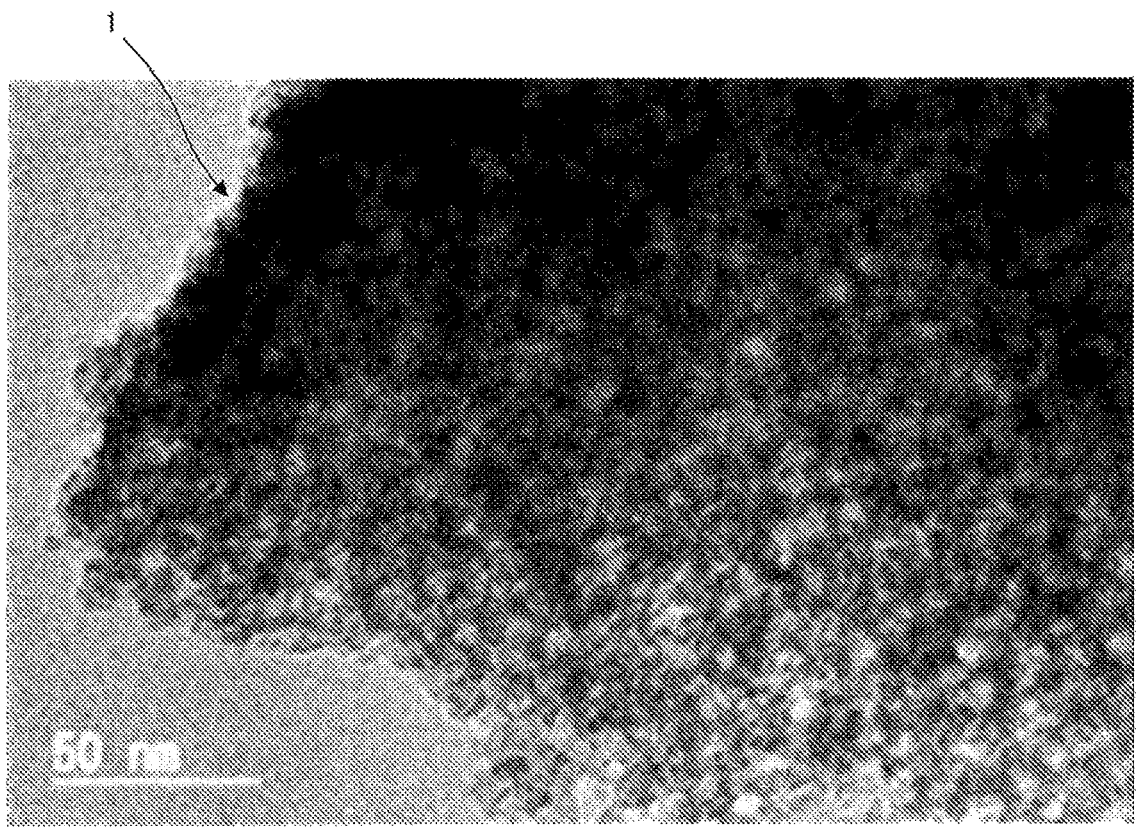
FIG. 3 is a TEM image of the photocatalyst according to Embodiment 1 of the present invention.

FIG. 3 is a TEM (transmission electron microscope) image of the photocatalyst according to Embodiment 1 of the present invention. The photocatalyst 1 illustrated in FIG. 3 is the photocatalyst 1 produced by the above-described method in which ammonium metatungstate was used as the tungsten oxide crystal precursor 2a and titanium lactate was used as the titanium oxide crystal precursor 3a. Specifically, the photocatalyst 1 was obtained by mixing ammonium metatungstate and titanium lactate in a ratio of 20 parts by mass of titanium to 100 parts by mass of tungsten, subjecting the resultant mixture to blow drying, and to firing at 420 degrees C.

The photocatalyst 1 illustrated in FIG. 3 was subjected to spectral analysis using the X-ray diffraction method. As a result, the diffraction peaks derived from a substance containing tungsten trioxide crystals, and the diffraction peaks derived from a substance containing anatase-type titanium dioxide crystals were observed. In other words, the photocatalyst 1 obtained by the above-described production method contains the tungsten oxide crystals 2 and the titanium oxide crystals 3 that oxidize chemical substances. As illustrated in the TEM image of FIG. 3, in the photocatalyst 1 obtained by the above-described production method, the tungsten oxide crystals 2 and the titanium oxide crystals 3 agglomerate to form a solid, and the crystal grain size Sw and the crystal grain size St are each 10 nm or less.

As mentioned above, in Embodiment 1, the photocatalyst 1 is formed such that the tungsten oxide crystals 2 and the titanium oxide crystals 3 that oxidize gaseous chemical substances are irregularly arranged. The crystal grain sizes St and Sw are each 10 nm or less. Thus, the substances forming the photocatalyst have small grain sizes, so that the photocatalyst 1 has a larger specific surface area, and has a higher capability of oxidizing gaseous chemical substances. Furthermore, since the photocatalyst 1 is formed such that the photocatalyst-forming substances having small grain sizes are irregularly arranged, the photocatalyst-forming substances have large contact areas therebetween, as compared with the existing photocatalyst in which the surfaces of tungsten oxide grains are covered with titanium oxide grains. This facilitates transfer of electrons and holes (electron holes) generated by photoirradiation, to provide higher catalytic activity.

The photocatalyst 1 is produced by a method of preparing a dispersion liquid containing the precursor of the tungsten oxide crystals 2 (tungsten oxide crystal precursor 2a) and the precursor of the titanium oxide crystals 3 (titanium oxide crystal precursor 3a), and firing the prepared dispersion liquid. As a result, from the precursors, tungsten oxide and titanium oxide are crystallized, to form a solid in which tungsten oxide and titanium oxide are closely packed. Thus, the photocatalyst 1 that efficiently decomposes gaseous chemical substances can be produced.

Embodiment 2

Figure 4:
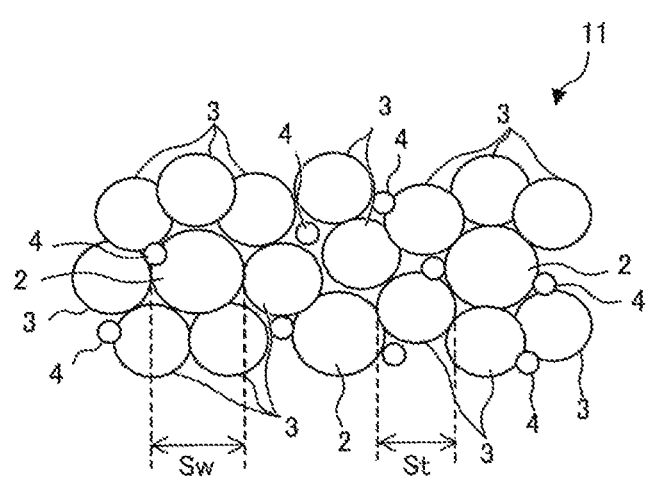
FIG. 4 is a schematic view of a photocatalyst according to Embodiment 2 of the present invention.

FIG. 4 is a schematic view of a photocatalyst 11 according to Embodiment 2 of the present invention. Hereinafter, Embodiment 2 will be described mainly in terms of differences from Embodiment 1 while descriptions of the same features and production steps as in Embodiment 1 will be omitted. In Embodiment 2, the photocatalyst 11 further contains, as a catalyst-forming substance, a metal 4 that causes multielectron reduction. Hereafter, a case where the metal 4 is platinum (Pt) will be described; however, the metal 4 may be any metal that can cause multielectron reduction. The photocatalyst 11 is formed such that the tungsten oxide crystals 2, the titanium oxide crystals 3, and the metal 4 are irregularly arranged.

Figure 5:
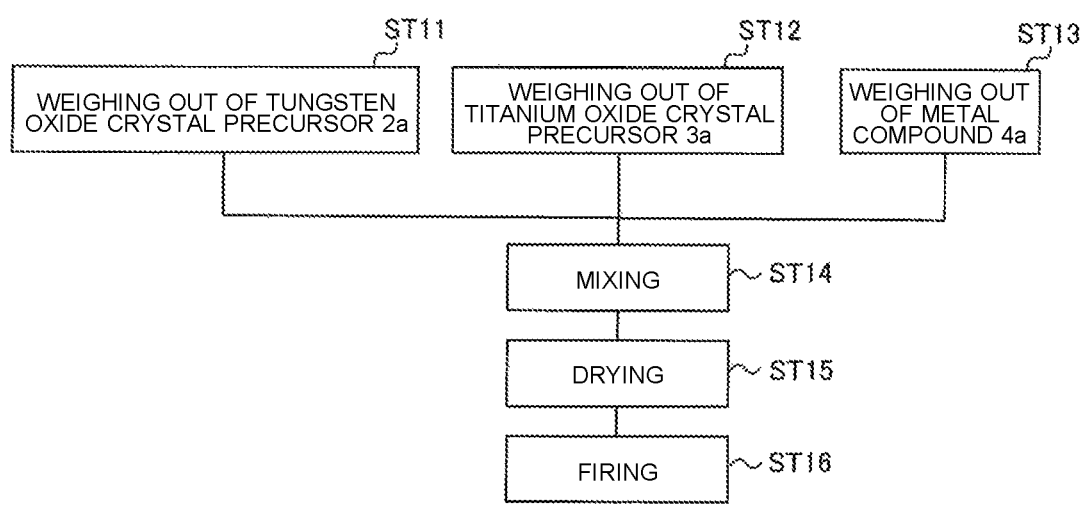
FIG. 5 illustrates steps of producing the photocatalyst according to Embodiment 2 of the present invention.

FIG. 5 illustrates steps of producing the photocatalyst according to Embodiment 2 of the present invention. The above-described photocatalyst 11 is produced by mixing the tungsten oxide crystal precursor 2a, the titanium oxide crystal precursor 3a, and a metal compound 4a that is the precursor of the metal 4, and drying and firing the resultant mixture.

As the metal compound 4a, chloroplatinic acid is used. However, the metal compound 4a is not limited to this and may be any metal compound that is fired and turned into the metal 4 that can cause multielectron reduction. Examples of the metal compound 4a in the case where the metal 4 is platinum Pt include, in addition to the above-described chloroplatinic acid, tetraammineplatinum and dinitrodiamineplatinum.

As illustrated in FIG. 5, a predetermined amount of the tungsten oxide crystal precursor 2a is weighed out (Step ST11), a predetermined amount of the titanium oxide crystal precursor 3a is weighed out (Step ST12), and a predetermined amount of the metal compound 4a is weighed out (Step ST13). Subsequently, the tungsten oxide crystal precursor 2a that has been weighed out, the titanium oxide crystal precursor 3a that has been weighed out, and the metal compound 4a that has been weighed out are mixed to prepare a mixture (Step ST14). For example, the mixture is prepared with a mixing ratio of 20 parts by mass of titanium and 0.5 parts by mass of platinum to 100 parts by mass of tungsten. The mixture is preferably a dispersion liquid prepared by dispersing, with a dispersing agent, the tungsten oxide crystal precursor 2a, the titanium oxide crystal precursor 3a, and the metal compound 4a.

Incidentally, the mixing ratio of the tungsten oxide crystal precursor 2a, the titanium oxide crystal precursor 3a, and the metal compound 4a is not particularly limited, and is preferably determined in accordance with, for example, the environment in which the photocatalyst 11 is disposed, the wavelength of light from the light source in the case of using a light source, or the target chemical substance to be decomposed.

The prepared mixture is subjected to blow drying (Step ST15), and fired at a predetermined temperature (for example, 420 degrees C.) (Step ST16). Incidentally, the firing temperature is not limited, and may be any temperature at which the tungsten oxide crystals 2, the titanium oxide crystals 3, and the metal 4 that can cause multielectron reduction are generated in the photocatalyst 11 by firing.

The photocatalyst 11 contains the metal 4 that can cause multielectron reduction. This promotes transfer of electrons and holes (electron holes) between photocatalyst constituent substances, to provide higher catalytic activity than in Embodiment 1. Thus, the photocatalyst 11 needs to contain, as illustrated in FIG. 4, the tungsten oxide crystals 2, the titanium oxide crystals 3, and the metal 4 produced from the raw materials including the tungsten oxide crystal precursor 2a, the titanium oxide crystal precursor 3a, and the metal compound 4a.

In general, as a method of determining whether or not the metal 4 that can cause multielectron reduction is obtained, X-ray photoelectron spectroscopy is used. In the photocatalyst 11, platinum serving as the metal 4 that can cause multielectron reduction bonds to at least one of the tungsten oxide crystals 2 and the titanium oxide crystals 3, and is present in a zerovalent state. Substances containing zerovalent platinum are known to have peaks in bond energies of 70 eV to 72 eV and 73 eV to 75 eV observed by X-ray photoelectron spectroscopy.

The photocatalyst 11 produced by the above-described method was subjected to spectral analysis using the X-ray diffraction method. As a result, the diffraction peaks derived from a substance containing tungsten trioxide crystals, and the diffraction peaks derived from a substance containing anatase-type titanium dioxide crystals were observed. In addition, X-ray photoelectron spectroscopy was performed to analyze the bond energy of the photocatalyst 11 produced by the above-described method. As a result, the peaks derived from a substance containing zerovalent platinum were observed. In other words, the photocatalyst 11 obtained by the above-described production method contains the tungsten oxide crystals 2 and the titanium oxide crystals 3 that oxidize chemical substances, and the metal 4 that can cause multielectron reduction.

In summary, in Embodiment 2, the photocatalyst 11 contains the metal 4 that causes multielectron reduction. This results in, compared with cases of not containing the metal 4 that causes multielectron reduction, high transfer efficiency of electrons and holes between catalyst constituent substances, and high catalytic activity of the photocatalyst 11. Such a photocatalyst 11 can be easily produced by a production method of mixing the tungsten oxide crystal precursor 2a, the titanium oxide crystal precursor 3a, and additionally the metal compound 4a to prepare a dispersion liquid, and firing the prepared dispersion liquid.

Embodiment 3

Figure 6:
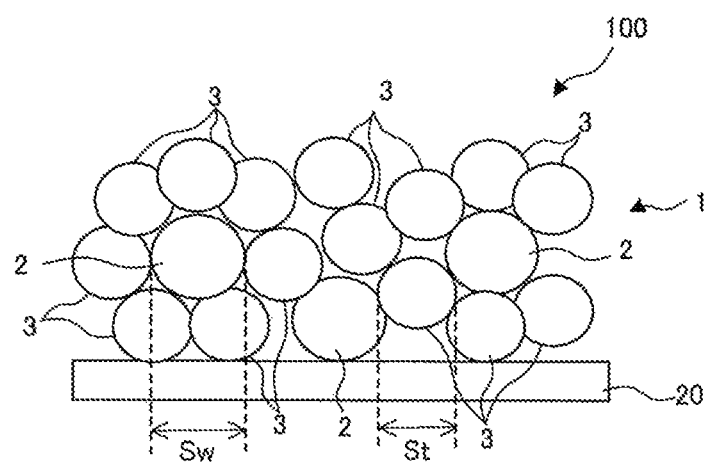
FIG. 6 is a schematic view of a photocatalyst carrier according to Embodiment 3 of the present invention.

FIG. 6 is a schematic view of a photocatalyst carrier according to Embodiment 3 of the present invention. Hereinafter, Embodiment 3 will be described mainly in terms of differences from Embodiment 1 while descriptions of the same features and production steps as in Embodiment 1 will be omitted. As illustrated in FIG. 6, a photocatalyst carrier 100 includes a photocatalyst 1 and a carrier base 20 carrying the photocatalyst 1. Hereafter, a case where the carrier base 20 is, for example, a ceramic foam base formed of cordierite will be described. The ceramic foam base has an open-cell three-dimensional skeleton structure. The carrier base 20 is not limited to this, and may be any base that is fired during production steps, but maintains its shape. Examples of the carrier base 20 include metal molded bodies, glass molded bodies, ceramic molded bodies, and nonwoven fabrics.

Figure 7:
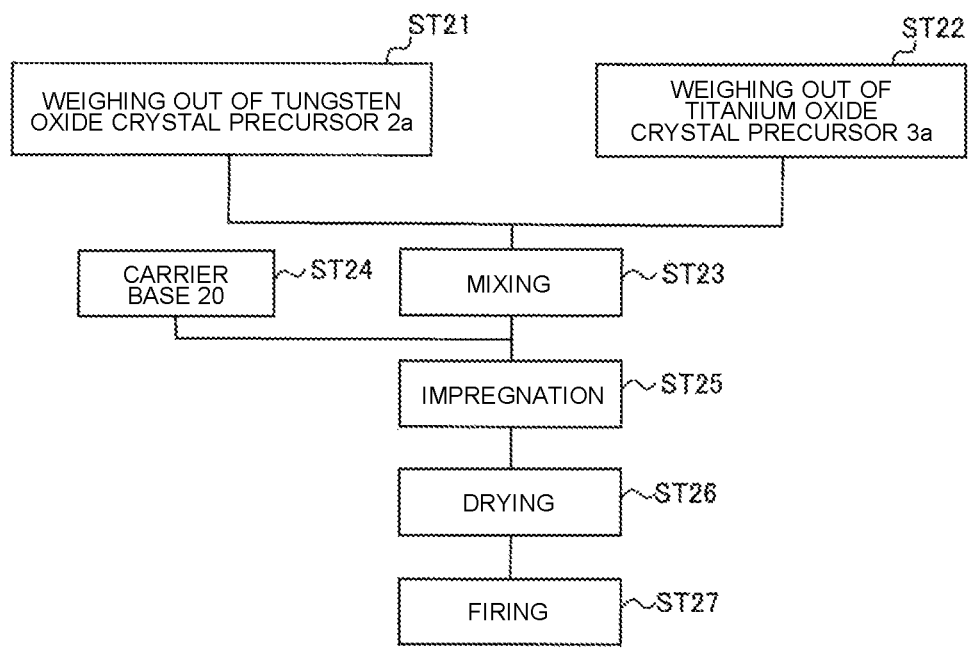
FIG. 7 illustrates steps of producing photocatalyst carriers according to Embodiments 3, 4, and 5 of the present invention.

FIG. 7 illustrates steps of producing the photocatalyst carrier according to Embodiment 3 of the present invention. The photocatalyst carrier 100 is produced by mixing the tungsten oxide crystal precursor 2a and the titanium oxide crystal precursor 3a to prepare a mixture, applying the mixture to the carrier base 20, drying and firing the applied mixture.

As illustrated in FIG. 7, a predetermined amount of the tungsten oxide crystal precursor 2a is weighed out (Step ST21), and a predetermined amount of the titanium oxide crystal precursor 3a is weighed out (Step ST22). Subsequently, the tungsten oxide crystal precursor 2a that has been weighed out and the titanium oxide crystal precursor 3a that has been weighed out are mixed to prepare a mixture (Step ST23). For example, the mixture is prepared with a mixing ratio of 20 parts by mass of titanium to 100 parts by mass of tungsten. The mixture is preferably a dispersion liquid prepared by dispersing, with a dispersing agent, the tungsten oxide crystal precursor 2a, the titanium oxide crystal precursor 3a, and the metal compound 4a. Incidentally, for example, the tungsten oxide crystal precursor 2a, the titanium oxide crystal precursor 3a, the mixing ratio, and the mixing process are not limited to those described above.

Subsequently, the tungsten oxide crystal precursor 2a and the titanium oxide crystal precursor 3a are impregnated into the carrier base 20 (Step ST24, Step ST25). Specifically, the mixture prepared in Step ST23 is applied to a ceramic foam base used as the carrier base 20. The impregnation process may be any process, and the examples include dipping, spraying, and coating.

The carrier base 20 having been impregnated with the mixture and filled with the tungsten oxide crystal precursor 2a and the titanium oxide crystal precursor 3a in Step ST25 is subjected to blow drying (Step ST26), and fired at a predetermined temperature (for example, 550 degrees C.) (Step ST27). Incidentally, the drying process is not particularly limited. Instead of the blow drying, another process such as hot-air drying, infrared drying, hot-plate drying, or reduced-pressure drying may be used. The firing temperature is not limited, and may be any temperature at which the tungsten oxide crystals 2 and the titanium oxide crystals 3 are obtained by firing.

In accordance with the above-described production method, a mixture of ammonium metatungstate and titanium lactate was impregnated into the carrier base 20, subjected to blow drying, and subsequently fired at 550 degrees C. to produce the photocatalyst carrier 100. The surface of the produced photocatalyst carrier 100 was subjected to spectral analysis using the X-ray diffraction method. As a result, the diffraction peaks derived from a substance containing tungsten trioxide crystals, and the diffraction peaks derived from a substance containing anatase-type titanium dioxide crystals were observed. In other words, the photocatalyst carrier 100 obtained by the above-described production method also contains the tungsten oxide crystals 2 and the titanium oxide crystals 3 that oxidize chemical substances.

The ceramic foam base used in Embodiment 3 was heated in the air atmosphere at 550 degrees C. for 1 hour, and the mass reduction ratio of the post-heating ceramic foam base to the pre-heating ceramic foam base was found to be 0%. Alternatively, in the case of using a base having a high mass reduction ratio due to firing, an upper limit may be set for the organic substance content of the carrier base 20 to ensure bonding between the photocatalyst 11 and the carrier base 20.

In summary, in Embodiment 3, the photocatalyst carrier 100 includes the photocatalyst 1 and the carrier base 20, which maintains the shape of the photocatalyst 1. As a result, the photocatalyst carrier 100 including the photocatalyst 1 is applicable to parts of air-cleaning devices in air conditioning for dwellings, commercial facilities, automobiles, and trains, for example.

The method for producing the photocatalyst carrier 100 is a method of applying, to the carrier base 20, a dispersion liquid containing the tungsten oxide crystal precursor 2a and the titanium oxide crystal precursor 3a, and firing the applied dispersion liquid. In this way, a photocatalyst layer is directly formed on the carrier base 20. This simplifies the production steps of the photocatalyst carrier 100, and enables easy production of a binderless photocatalyst carrier 100.

Embodiment 4

FIG. 7 illustrates steps of producing a photocatalyst carrier according to Embodiment 4 of the present invention. In Embodiment 3, the carrier base 20 is a ceramic foam base. By contrast, in Embodiment 4, the carrier base 20 is a nonwoven fabric. Hereinafter, Embodiment 4 will be described mainly in terms of differences from Embodiment 3 while descriptions of the same features and production steps as in Embodiment 3 will be omitted.

The carrier base 20 is a nonwoven fabric composed of glass fibers and polyester fibers, and having a mass per unit area (mass per unit area) of 100 g/m². The nonwoven fabric has a fiber mixing ratio of 50 parts by mass of polyester fibers to 50 parts by mass of glass fibers. The nonwoven fabric used as the carrier base 20 was heated in the air atmosphere at 550 degrees C. for 1 hour, and the mass reduction ratio of the post-heating nonwoven fabric to the pre-heating nonwoven fabric was found to be 49%. Incidentally, the above-described fiber species and fiber mixing ratio of the nonwoven fabric are non-limiting examples.

When the carrier base 20 is formed of a nonwoven fabric, as in Embodiment 3, the production method illustrated in FIG. 7 is performed to produce the photocatalyst carrier 100. Specifically, a dispersion liquid prepared by mixing the tungsten oxide crystal precursor 2a and the titanium oxide crystal precursor 3a is impregnated into the nonwoven fabric, dried, and fired to produce the photocatalyst carrier 100.

The surface of the photocatalyst carrier 100 produced by the above-described method was subjected to spectral analysis using the X-ray diffraction method. As a result, the diffraction peaks derived from a substance containing tungsten trioxide crystals, and the diffraction peaks derived from a substance containing anatase-type titanium dioxide crystals were observed. In other words, the photocatalyst carrier 100 obtained by the above-described production method also contains the tungsten oxide crystals 2 and the titanium oxide crystals 3 that oxidize chemical substances.

In summary, in Embodiment 4, the carrier base 20 is a nonwoven fabric. In this case, the carrier base 20 that is a nonwoven fabric can be used to produce a sheet-shaped photocatalyst carrier 100. The sheet-shaped photocatalyst carrier 100 can be easily processed into a corrugated or pleated filter, for example.

In the steps of producing the photocatalyst carrier 100, the carrier base 20 coated with the dispersion liquid has an organic substance content of 50% by mass or less to set the mass reduction ratio of before and after firing to 50% or less. This suppresses the thermal variation amount of the carrier base 20, to stabilize the positions of the precursors impregnated into the carrier base 20 is impregnated, to ensure bonding between the carrier base 20 and the photocatalyst layer in the photocatalyst carrier 100.

Embodiment 5

Figure 8:
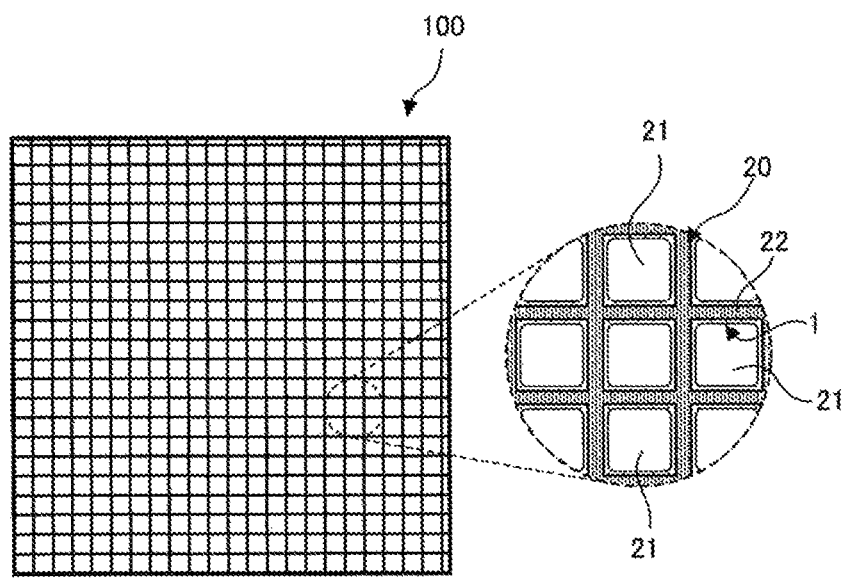
FIG. 8 is a schematic view of the photocatalyst carrier according to Embodiment 5 of the present invention.

FIG. 7 illustrates steps of producing a photocatalyst carrier according to Embodiment 5 of the present invention. FIG. 8 is a schematic view of the photocatalyst carrier according to Embodiment 5 of the present invention. In Embodiment 3, the carrier base 20 is a ceramic foam base. By contrast, in Embodiment 5, the carrier base 20 is a ceramic honeycomb. The ceramic honeycomb is a honeycomb structure in which a plurality of cells 21 are formed. Hereinafter, Embodiment 5 will be described mainly in terms of differences from Embodiment 3 while descriptions of the same features and production steps as in Embodiment 3 will be omitted.

The carrier base 20 is a ceramic honeycomb composed of a ceramic such as cordierite and having a cell density of 100 to 400 cpsi. As illustrated in FIG. 8, the ceramic honeycomb has a quadrangular outer shape when viewed from the front. The ceramic honeycomb has the following composition proportions: 50 parts by mass of a silica component, 35 parts by mass of an alumina component, and 15 parts by mass of a magnesium component.

The ceramic honeycomb has an inner wall 22. The inner wall 22 divides adjacent cells 21. In the one example illustrated in FIG. 8, the inner wall 22 having a grid pattern defines each cell 21 to have a quadrangular shape. In the thickness direction of the carrier base 20, the cells 21 extend parallel to each other to form channels. Incidentally, the above-described species, outer shape, and composition proportions of the ceramic honeycomb and the shape of the cells 21 are non-limiting examples. For example, the ceramic honeycomb may have a circular outer shape and each cell 21 may have a regular hexagonal shape.

When the carrier base 20 of the photocatalyst carrier 100 is constituted by a ceramic honeycomb, the carrier base 20 also carries the photocatalyst 1. Specifically, on the surface of the inner wall 22 of the ceramic honeycomb, a layer of the photocatalyst 1 (photocatalyst layer) is formed.

The photocatalyst carrier 100 including a ceramic honeycomb as the carrier base 20 is produced by, as in Embodiment 3, the production method illustrated in FIG. 7. Specifically, a dispersion liquid prepared by mixing the tungsten oxide crystal precursor 2a and the titanium oxide crystal precursor 3a is impregnated into the ceramic honeycomb, dried, and fired to obtain the photocatalyst carrier 100.

The surface of the photocatalyst carrier 100 produced by the above-described method was subjected to spectral analysis using the X-ray diffraction method. As a result, the diffraction peaks derived from a substance containing tungsten trioxide crystals, and the diffraction peaks derived from a substance containing anatase-type titanium dioxide crystals were observed. In other words, the photocatalyst carrier 100 obtained by the above-described production method also contains the tungsten oxide crystals 2 and the titanium oxide crystals 3 that oxidize chemical substances.

In summary, in Embodiment 5, the carrier base 20 of the photocatalyst carrier 100 is a ceramic honeycomb. In this case, the ceramic honeycomb can be used to produce a filter-shaped photocatalyst carrier 100. In the photocatalyst carrier 100 of Embodiment 5, a photocatalyst layer is formed on the inner wall 22 of the ceramic honeycomb, so that gaseous chemical substances passing through the cells 21 serving as channels come into contact with the photocatalyst 1. Thus, the photocatalyst carrier 100 including the ceramic honeycomb provides a filter that is lightweight, has high rigidity, and has a reduced pressure drop. When the photocatalyst carrier 100 is applied to an air-cleaning device, the power of the fan for introducing gaseous chemical substances into the air-cleaning device can be reduced, to thereby achieve a reduction in the operation costs of the air-cleaning device.

Embodiments of the present invention are not limited to the above-described embodiments, and can be modified in various ways. For example, in the photocatalyst carriers 100 of Embodiments 3, 4, and 5, the photocatalysts 11 may contain, as in Embodiment 2, the metal 4 that can cause multielectron reduction.

REFERENCE SIGNS LIST 1 photocatalyst 2 tungsten oxide crystal 2a tungsten oxide crystal precursor 2θ diffraction angle 3 titanium oxide crystal 3a titanium oxide crystal precursor 4 metal 4a metal compound 11 photocatalyst 20 carrier base cell 22 inner wall 100 photocatalyst carrier St crystal grain size Sw crystal grain size.

The invention claimed is:

1. A photocatalyst comprising plural tungsten oxide microcrystals and plural anatase-type titanium oxide microcrystals and being capable of causing a photocatalytic reaction by photoirradiation, wherein the plural tungsten oxide microcrystals are tungsten oxide microcrystals each have a crystal grain size of 10 nm or less and being able to oxidize a gaseous chemical substance, the plural anatase-type titanium oxide crystals are anatase-type titanium oxide microcrystals each having a crystal grain size of 10 nm or less and being able to oxidize a gaseous chemical substance, the photocatalyst further comprising, between the plural tungsten oxide microcrystals and the plural anatase-type titanium oxide microcrystals, a metal that can cause multielectron reduction and promote transfer of electrons and holes generated from the plural tungsten oxide microcrystals or the plural anatase-type titanium oxide microcrystals by the photoirradiation, and tungsten oxide microcrystals are irregularly arranged with the plural anatase-type titanium oxide microcrystals.

2. The photocatalyst of claim 1, wherein the metal that can cause the multielectron reduction is platinum.

3. A photocatalyst carrier comprising:
the photocatalyst of claim 1; and
a carrier base carrying the photocatalyst.

4. The photocatalyst carrier of claim 3, wherein the carrier base is a ceramic foam, a nonwoven fabric, or a ceramic honeycomb.

5. The photocatalyst carrier of claim 3, wherein the carrier base has an organic substance content of 50% or less by mass.

6. A method for producing a photocatalyst comprising plural tungsten oxide microcrystals and plural anatase-type titanium oxide crystals and being capable of causing a photocatalytic reaction by photoirradiation, wherein the plural tungsten oxide microcrystals are anatase-type tungsten oxide microcrystals each having a crystal grain size of 10 nm or less and being able to oxidize a gaseous chemical substance and, the plural anatase-type titanium oxide microcrystals are anatase-type titanium oxide microcrystals each having a crystal grain size of 10 nm or less and being able to oxidize the gaseous chemical substance, and the photocatalyst further comprising, between the plural tungsten oxide microcrystals and the plural anatase-type titanium oxide microcrystals, a metal that can cause multielectron reduction and promote transfer of electrons and holes generated from the plural tungsten oxide microcrystals or the plural anatase-type titanium oxide microcrystals by the photoirradiation, and tungsten oxide microcrystals are irregularly arranged with the plural anatase-type titanium oxide microcrystals, the method comprising:

preparing a dispersion liquid comprising a precursor of the tungsten oxide microcrystals, a precursor of the titanium oxide microcrystals and the metal that can cause the multielectron reduction, and firing the dispersion liquid.

7. The method of claim 6, wherein the precursor of the tungsten oxide microcrystals is ammonium metatungstate, ammonium paratungstate, tungstic acid, tungsten chloride, or tungsten alkoxide, and the precursor of the titanium oxide microcrystals is titanium lactate, titanium trichloride, titanium tetrachloride, titanium sulfate, titanium oxysulfate, titanium oxychloride, or titanium tetraisopropoxide.

8. A method for producing a photocatalyst carrier including a photocatalyst comprising plural tungsten oxide microcrystals and plural anatase-type titanium oxide crystals and being capable of causing a photocatalytic reaction by photoirradiation, wherein the plural tungsten oxide microcrystals are tungsten oxide microcrystals each having a crystal grain size of 10 nm or less and being able to oxidize a gaseous chemical substance, the plural anatase-type titanium oxide microcrystals are anatase-type titanium oxide microcrystals each having a crystal grain size of 10 nm or less and being able to oxidize the gaseous chemical substance, and the tungsten oxide microcrystals are irregularly arranged with by the plural anatase-type titanium oxide microcrystals, the method comprising:

applying a dispersion liquid comprising a precursor of the tungsten oxide microcrystals, a precursor of the titanium oxide microcrystals and the metal that can cause the multielectron reduction, to the carrier base, to obtain an applied dispersion liquid, and firing the applied dispersion liquid to form a photocatalyst layer.

* * * * *